United States Patent [19]

Andre

[11] Patent Number: 4,676,828
[45] Date of Patent: Jun. 30, 1987

[54] PROCESS FOR THE LEACHING OF SULPHIDES CONTAINING ZINC AND IRON

[75] Inventor: Jean A. Andre, Angleur, Belgium

[73] Assignee: Societe Des Mines et Fonderies De La Vieille Montagne, Angleur, Belgium

[21] Appl. No.: 737,620

[22] Filed: May 24, 1985

[30] Foreign Application Priority Data

May 28, 1984 [LU] Luxembourg ............................ 85385

[51] Int. Cl.$^4$ ....................... C22B 15/08; C22B 19/22; C22B 11/04; C22B 13/04
[52] U.S. Cl. .................................... 75/101 R; 75/117; 75/118 R; 75/120
[58] Field of Search ................. 75/101 R, 117, 118 R, 75/120

[56] References Cited

U.S. PATENT DOCUMENTS

| | | | |
|---|---|---|---|
| 4,440,569 | 4/1984 | Weir et al. | 75/101 R |
| 4,505,744 | 3/1985 | Weir et al. | 75/101 R |
| 4,510,028 | 4/1985 | Bolton et al. | 75/101 R |
| 4,545,963 | 10/1985 | Weir et al. | 75/101 R |

Primary Examiner—Melvyn J. Andrews
Attorney, Agent, or Firm—Sughrue, Mion, Zinn, Macpeak & Seas

[57] ABSTRACT

The extraction of zinc and copper and the recovery of precious metals from sulphurous zinciferous materials, also containing iron, becomes possible when these are treated by leaching under pressure in two stages, by judiciously controlling the relative quantities of sulphurous materials and acid.

5 Claims, 3 Drawing Figures

PROCESS FOR THE LEACHING OF SULPHIDES CONTAINING ZINC AND IRON

The present invention relates to a hydrometallurgical process for extracting zinc and copper and recovering precious metals, principally silver, and optically lead from sulphurous zinciferous materials also containing iron, according to which the sulphurous materials are treated in at least two leaching steps, the first leaching being carried out at a temperature of from 120° to 160° C., above the melting point of sulphur under oxidizing conditions and in the presence of a dilute aqueous solution of sulphuric acid, ensuring that the zinc is incompletely dissolved, the second leaching being carried out under atmospheric pressure, also by means of a dilute aqueous solution of sulphuric acid, so as to form a zinc sulphate solution and a residue containing sulphur, residual zinc, copper, iron and, most of the lead and precious metals.

The invention relates to a process which can be integrated in existing hydrometallurigcal plants and which owing to its flexibility, will contribute to allowing these plants to treat blendes of diverse origins.

A process is known from French Pat. No. 2 207 192 for extracting zinc present in sulphurous materials containing zinc and iron, according to which the said sulphides, in a finely-divided form, are dispersed in an aqueous solution of sulphuric acid by controlling the relative quantities of acid and sulphides in the dispersion, in such a manner that the quantity of acid present is at least sufficient for selectivity converting the zinc present to zinc sulphate, up to a predetermined concentration, the reaction mixture being brought, under pressure, in the presence of oxygen, to a temperature above the melting point of sulphur. The degree of acidity of the reaction mixture on completion of reaction is selected weak, in such a manner as to ensure the elimination of iron from the leaching solution, by precipitation in the form of an insoluble residue of jarosite $KFe_3(SO_4)_3(OH)_6$ or $NaFe_3(SO_4)_3(OH)_6$, iron hydroxide and basic iron sulphate.

These residues also contain undissolved iron and copper sulphides, sulphur, silver and lead.

These are principally present in the form of silver jarosite $AgFe_3(SO_4)_2(OH)_6$ and lead jarosite $PbFe_6(SO_4)_4(OH)_{12}$.

By treating these residues by flotation, a concentrate of sulphur and sulphides containing a low proportion of silver is obtained on the one hand, and on the other hand a sterile product, containing almost all the lead and silver in a form which is, however, so diluted by iron that it is very difficult to recover these by an economical method.

A hydrometallurgical process of leaching under pressure in two phases, of mineral sulphides containing zinc and iron, by means of an aqueous solution of sulphuric acid, so as to extract zinc, is also known from U.S. Pat. No. 4,004,991. This involves a solid-liquid extraction in counter current, carried out in two successive stages in temperature and oxidation conditions equivalent to those of the aforementioned French Pat. No. 2 207 192.

The phase to be extracted consists of finely-divided mineral sulphides and molten sulphur, whereas the solvent is the recycling electrolyte.

To obtain a rapid and complete extraction of zinc and a final leaching solution wiith a low content of dissolved iron and free acid, the first stage is carried out in the presence of a substantial excess of zinc in relation to the available acid resulting from the second stage. The first stage allows the thorough elimination of the acid and the iron.

The second leaching stage is carried out starting from the leaching residue of the first stage for the complete extraction of zinc.

The residues from the second stage contain silver and lead, principally in the form of jarosites which are, moreover, substantially diluted by iron precipitates, particularly by iron hydroxide and basic iron sulphate.

By subjecting these residues to flotation, a concentrate of sulphur and sulphides with a low proportion of silver and lead is obtained on the one hand, and on the other hand a plumbiferous sterile product.

In spite of the fact that this sterile product contains almost all the lead and silver, the presence of a large quantity of jarosites, iron hydroxide and basic iron sulphate renders the recovery of these metals hardly economical.

According to a third known process described in U.S. Pat. No. 4,440,569 to Weir et al (which corresponds to British Patent Application No. 2,144,966), since it is extracted from zinciferous sulphidic material which also contains iron together with lead and/or silver.

The process includes a high acid pressure leach 88 in which sulphidic zinciferous materials are leached under oxidizing conditions at a temperature in the range of from about 130° to about 170° C. in aqueous sulphuric acid solution with a stoichiometric excess of sulphuric acid relative to the zinc content of the material of from about 40 to about 100% to produce an undissolved residue containing a major proportionf lead and/or silver and a leash solution containing a major proportion of the zinc and iron. The residue 90 is separated from the leach solution and treated in 92 to recover lead and/or silver values.

In order to completely dissolve the zinc during the high acid pressure leach, the dispersion is subjected to severe temperature and oxidation conditions.

These conditions are so severe that they involve substantial oxidation of the solubilized iron.

At the elevated temperatures to which this leaching 88 is subjected, the oxidized iron rapidly forms jarosite precipitates, among others, lead and silver jarosites, which jeopardize the recovery of these metals. To avoid the formation of jarosite precipitates, the degree of acidioty of the reaction mixture on completion of reaction is maintained at a very high value above 60 to 70 g/l of free acid, in such a manner as to obtain in 90 on the one hand, a leaching solution containing almost all the zinc and iron of the starting material and, on the other hand, an undissolved residue which contains most of the silver and lead and only a small quantity of jarosite.

The residue is treated by flotation and the silver is recovered in a sulphur concentrate with a yield capable of reaching 85%.

Since its acidity is very high, the final sulphide leaching solution is brought towards a stage of hot acid leaching 108 of a roating-leaching process, in which the sulphurous starting materials are firstly roasted in such a manner as to be converted to materials containing zinc oxide and zinc ferrite and then treated in 96 as a preliminary with a weak aqueous sulphuric acid issued from an acid leach 104, to dissolve zinc oxide and produce a leach solution containing dissolved zinc and a zinc ferrite containing residue. The residue is separated from the leach solution 96. Zinc is recovered by electrolysis 102 from the leach solution 98 and a zinc ferrite containing pasteous residue is then treated with a strong aqueous sulphuric acid solution in a hot and leaching stage 108, to dissolve zinc ferrite.

In this stage 108, part of the acid resulting from the high acid hot pressure leaching 88 of the sulphides is consumed on contact with zinc oxide, issued from the acid leach 104.

The solution produced during the hot acid leaching 108 of the zinc ferrite, contains zinc and iron. It is separated from a residue and leading a reduction 112. Ferric iron in the leach solution is reduced to ferrous iron and the ferrous iron is neutralized and hydrolyzed under oxidizing conditions to precipitate an iron compound, which is separated from the remaining solution.

The leach slurry from the hot acid leach 108 is separated in an overflow passing to a reduction step 112 and an underflow which is further leached and treated to separate silver residue.

In a few words, the essence of the leaching process developed by Weir consists in the feature that:

the acid level in the pressure latch unchange slurry is maintained above 60 g/l, in order to avoid the producing of a residue of free jarosite;

when the acid level in the pressure leach discharge slurry dropped to under 60 g/l, lead jarosite formation occurs with the result that the lead residue after flotation is contaminated with significant amounts of iron.

The almost complete dissolution of zinc of the sulphurous materials on leaching under pressure demands very high oxidation conditions, particularly on completion of the operation resulting in the direct sulphation of sulphur of the sulphides to sulphates.

Here are summarized the operating conditions:

| Process A: $H_2SO_4$ 60 g/l | | Process B: $H_2SO_4$ 60 g/l |
| --- | --- | --- |
| discharge slurry | 8 | from 8 to 9 |
| reference column line | 16 table | 55 ... 10 |
| $H_2SO_4$ g/l | 70–95 | 60 |
| Fe t g/l | 14–17 | ? |
| $Fe^{2+}$ g/l | 1 | ? |
| $Fe^{3+}$ g/l | 13–16 | ? |
| result Cu extraction % (calculated) | 70 | — |
| reference column line | 8 45 | 9 5 |
| Ag flotation recovery % | 86 | 42.5 |

All in all, the Weir's Process described in U.S. Pat. No. 4,440,569 and Great Britain Pat. No. 2,114,966 results in the combination of a leaching of the sulphides, identical to that described in French Pat. No. 2,207,192 and a leaching under pressure of calcine resulting from roasting sulphurous materials.

It lacks flexibility since the integration of two different methods of leaching, on the one hand of sulphides and on the other hand of calcine, is difficult to carry out and to control when the solutions of one of the methods are used for conducting the reactions of the process of the other method.

Material balance proves that by the Weir's process only from 15 to 25% of the total quantity of sulphurous starting materials can be treated by the method of leaching under pressure of sulphides.

These necessary quantities of calcine would be so high that this process is reduced to an additional process added to an existing combination treating sulphurous zinciferous materials by roasting.

It is obvious that no $Fe3+$ limitation is recommended in order to get a high Ag flotation recover when the free acid is lower than 60 g/l.

No mention is made of the high rate of oxidation of $S^{--}$ to $SO_4^{--}$.

Moreover, it is to be noted that by this process, the copper contained in the sulphurous starting materials is only very partially dissolved. The amount dissolved rarely exceeds 60%. The residual copper is thus found in the leaching residue and the financial loss can be considerable.

Moreover, since the residual copper is entrained in the sulphur concentrate during flotation, with more or less considerable quantities of silver, subsequent treatments for recovering silver can be rendered difficult.

The almost complete dissolution of zinc of the sulphurous materials on leaching under pressure demands very high oxidation conditions, particularly on completion of the operation, resulting in the direct sulphation of sulphur of the sulphides to sulphates.

This direct sulphation is greater than at least 8% and brings about an accumulation of sulphate in the hydrometallurgical circuit for the production of zinc, necessitating the precipitation of this excess by means of lime, this involving extra operational costs and losses of zinc.

Finally, the recovery of silver in the sulphur concentrate being limited to at best 85%, the remainder of the silver collected with the sterile flotation product will be lost if the lead content is insufficient for constituting a commercial material. If the sulphurous materials are rich in silver, the loss can be substantial.

The present invention has the object of remedying the above-mentioned disadvantages and proposes a process which allows sulphurous zinciferous materials of diverse origins, containing copper and also iron, optionally rich in lead and precious metals, to be leached by supplying a solution containing zinc, copper and soluble iron, the acidity of which is sufficiently low so as to not to pose a problem to the sucessively required treatments of this solution before the electrolysis of zinc and residues containing most of the lead and precious metals in a form such that they can be recovered by flotation.

An additional advantage of the proposed process is that it either allows the production capacity of an existing unit, having roasting units, to be increased without having to increase this unit, or production to be maintained without having to replace old roasting units. Since this process produces solutions containing zinc and copper with low acidity, it is easily integrated in existing units without disturbing the whole, and it is also sufficiently flexible to adapt to successive changes or variations in capacity.

The present invention relates to a hydrometallurgic process for extracting zinc and copper and recovering lead and/or precious metals, principally silver, from sulphurous zinciferous materials also containing iron, according to which the sulphurous materials are treated in at least two leaching stages, the first leaching being carried out at a temperature of from 120° to 160° C., above the melting point of sulphur, under oxidizing conditions and in the presence of a dilute aqueous solution of sulphuric acid, ensuring that the zinc is completely dissolved, the second leaching being carried out under atmospheric pressure, also by means of a dilute aqueous solution of sulphuric acid, so as to form a zinc sulphate solution and a residue containing sulphur, residual zinc, copper, iron and most of the lead and precious metals.

This process is essentially characterised in that during the first leaching, the relative quantities of sulphurous materials and acid of a dilute aqueous solution of sulphuric acid are regulated in such a manner that the zinc is in stoichiometric excess in relation to the acid actually consumed during this first leaching, the said excess being, however, below 15% and the oxygen pressure being regulated so that on the one hand, the zinc sulphate solution produced has a content of free sulphuric acid of from 20 to 60 g/l of $H_2SO_4$ and a content of ferric acid of from 1 to 5 g/l and, on the other hand, the above-mentioned undissolved residue contains sulphur, residual zinc, residual copper, iron, principally in the form of sulphide substantially free from jarosite, and almost all of the lead and precious metals such as silver. The second leaching is carried out under atmospheric pressure at a temperature below the boiling point of the reaction mixture, in the presence of finely-dispersed oxygen, the relative quantities of materials consisting of the residue of the first leaching and acid of a dilute aqueous solution of sulphuric acid being selected in such a manner that the acid is in substantial excess in relation to the quantity of zinc in the residue, this excess and the quantity of oxygen being controlled in such a manner as to produce, on the one hand, a solution which has a content of free acid of from 60 to 160 g/l and a content of ferric iron of from 2 to 3 g/l, in which most of the residual copper of the first leaching is dissolved, and, on the other hand, to produce an insoluble final residue containing sulphur in elemental form, iron in the form of sulphide free from jarosite, and most of the lead and precious metals contained in the starting ore, in a mineralogical form which can be recovered by a flotation process.

According to a particular characteristic of the invention, the solution resulting from the first leaching is conducted towards a third leaching, carried out under atmospheric pressure, at a temperature below the boiling point of the reaction mixture, in the presence of finely-dispersed oxygen, while controlling the relative quantities of the sulphurous materials according to the acid contained in this solution, in such a manner that the zinc in the material is in stoichiometric excess of at least 100% in relation to the acid, as well as controlling the quantity of oxygen in such a manner as to produce a zinc sulphate solution having a content of free sulphuric acid of from 4 to 8 g/l and a content of ferric iron of from 1 to 2 g/l. Finally, the insoluble residue containing sulphur, zinc sulphides, copper and iron, and almost all of the lead and precious metals, is conducted towards the above-mentioned double leaching.

According to another particular characteristic of the invention, the relative quantities of sulphurous materials or of residue and acid are controlled in each of the above-mentioned leachings, in such a manner as to obtain, in the zinc sulphate solution, a desired free acid concentration and the partial pressure of oxygen is controlled by measuring the oxidation-reduction potential of the ferrous iron-ferric iron couple of the solution, so as to obtain, after carrying out all the leachings in counter current, on the one hand a solution containing from 4 to 8 g/l of free sulphuric acid and from 1 to 2 g/l of ferric iron which is used for hydrolysis of the iron and, on the other hand, a final undissolved residue, substantially free from zinc and copper and which contains sulphur, iron, essentially in the form of sulphide free from jarosite, and most of the lead and precious metals which are recovered by a flotation process.

In a particular embodiment, the solution resulting from the first leaching is conducted at the same time as a solution resulting from a second process of leaching of sulphurous materials which have been subjected to roasting, towards a leaching of sulphurous starting materials carried out in the presence of finely-dispersed oxygen, at a temperature below the boiling point of the solutions, while controlling the relative quantities of sulphurous materials according to the acid contained in these solutions, in such a manner that the solution has a content of zinc in an excess of at least 100% in relation to the acid and controlling the quantity of oxygen in such a manner that the solution produced has a content of free acid of from 8 to 35 g/l and a content of ferric acid of from 1 to 2.5 g/l and a residue containing sulphur, residual zinc sulphides, copper and iron, as well as most of the lead and precious metals which are conducted towards the above-mentioned double leaching.

Other particular characteristics and details of the invention will become apparent from the following detailed description, referring to the attached drawings representing the principal schemes of different hydrometallurgical installations according to the invention.

In these drawings.

In the above-mentioned figures, identical reference numerals indicate identical or analogous elements.

Figure 1:
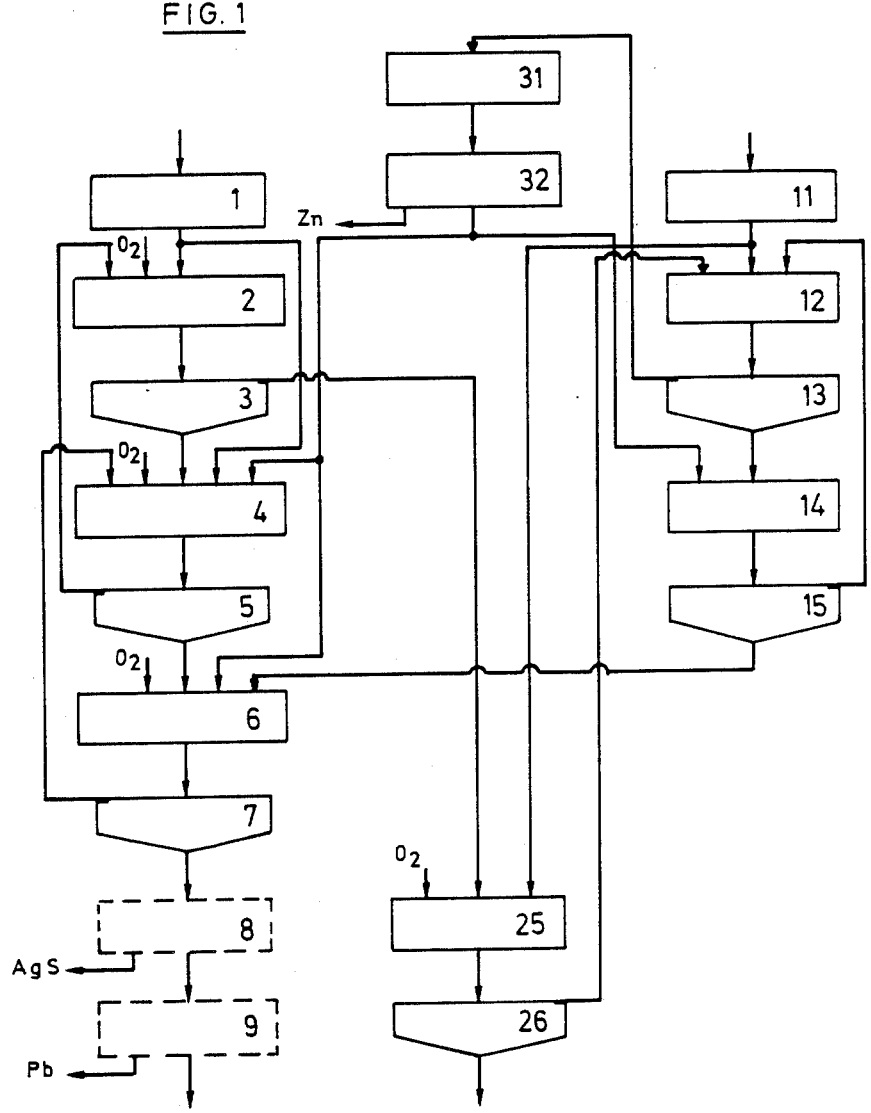
FIG. 1 is a schematic view of a process for recovering zinc from sulphurous zinc materials also containing iron, copper, lead and precious metals by successive leachings according to a preferred method of the invention.

The sulphurous zinciferous materials available on the market not only contain zinc, but also substantial quantities of iron and not negligible quantities of lead, copper and precious metals which it is economically desirable to recover.

The leaching process according to the invention allows the economical recovery of these metals. It comprises at least the following operations:

pulverisation of the starting ore to fine particles, indicated by the reference numeral 1;

a first leaching under pressure 4 by means of an acid solution with intense stirring, in the presence of oxygen, at a temperature of from 125° to 160° C., the acidity of the solution after this leaching is from 20 to 60 g/l;

a second leaching carried out under atmospheric pressure, by means of an acidic recycled electrolysis solution, at a temperature below the boiling point of the solution. The solution resulting from this second leaching is recycled to the first leaching while the residue, principally consisting of sulphur, iron sulphide and also lead and precious metals is subjected to a flotation. The precious metals and the lead are recovered herefrom with a high yield owing to their favourable mineralogical form.

As shown in FIG. 1, at least part of the finely-divided starting material at 1 is suspended in the form of pulp, during an atmospheric leaching with low acidity, in a solution resulting from a leaching under pressure 4 in the presence of finely-dispersed oxygen, with intense stirring.

The relative quantities of acid and sulphurous materials are controlled in such a manner that the zinc of the starting material is in stoichiometric excess of at least 100% in relation to the acid available for producing a zinc sulphate solution containing from 4 to 8 g/l of free acid, the quantity of oxygen being simultaneously controlled so that the content of ferric iron of the same said solution is from 1 to 2 g/l. The temperature of the suspension is maintained below the boiling point of the solution and ideally between 75° and 95° C.

This leaching can, in this manner, be carried out in an open or closed trough under a very low pressure, ideally between 75° and 95° C. Under these temperature and oxidation conditions, the copper is kept in solution, in spite of the presence of sulphides.

The copper is kept in solution by maintaining the oxidation-reduction potential of the solutions at as high a value as possible. On the other hand, the iron does not precipitate, in spite of the low acidity, if the potential of the solutions is maintained at a sufficiently low value. By maintaining the content of ferric iron between 1 and 2 g/l, the copper and the iron are simultaneously kept in solution. The solution produced in this leaching therefore contains almost all the copper contained in the supplied solution produced at the double leaching stage 4 and 6 and also the dissolved iron. This solution now only contains a negligible quantity of acid.

The solution produced in the leaching 2 with low acidity, after decantation 3 or filtration, is directly conducted towards the precipitation of iron 25 by hydrolysis, in the form of goethite obtained by injecting oxygen, the geothite reagent being calcine produced by roasting sulphurous materials. After separation of the iron residue obtained, the solution undergoes a complete elimination of iron and various impurities in the neutral leaching 12 carried out in the presence of calcine, the iron being oxidized by air or oxygen. The residue obtained at 13 undergoes an acid leaching designed to complete the dissolving of the zinc oxide. The zinc ferrite residue is treated in the acid leaching 6 described below. The solution 15 is conducted towards the neutral leaching 12, the solution 13 of which is purified, for example according to the process described in Belgian Pat. No. 783 549, and then conducted to the electrolysis 32 where zinc and the so-called acidic electrolysis recycle solution are produced.

The residue of the leaching 2, after separation of the solution by thickening or filtration, is conducted, together with fresh sulphurous material if necessary, to the leaching under pressure which constitutes the first stage of the double leaching 4 and 6 in a receiver under pressure, provided with an efficient stirring system, for example in an autoclave or a tubular reactor. These materials are there mixed with the acid solution produced by the leaching 6 and the acid solution resulting from the electrolysis containing from 160 to 200 g/l of free acid. The mixture is there treated in the presence of oxygen or a gas containing oxygen, at a temperature above the melting point of sulphur, that is above about 120° C., but at a temperature below about 160° C.

The relative quantities of a sulphurous material in the suspension 4 are adjusted in such a manner that the acidity of the solution falls progressively to a value of from 20 to 60 g/l without aiming for the complete dissolving of the zinc of the material, this being, however, above about 85%.

At the same time, the oxygen pressure is selected in such a manner that the content of ferric iron is from 1 to 5 g/l on completion of the leaching, whereby the concentration of ferric iron should be all the lower since the final acidity aimed for is lower.

It has been noted that it is possible to conduct the leaching of the sulphides under pressure and at a high temperature so as to produce a zinc sulphate solution in which the iron is essentially maintained in a ferrous state, that is in a form in which the iron does not precipitate from solution.

This is achieved by judiciously controlling, among other things, the stirring of the pulp, so as to achieve the best possible solid-liquid contacts, without, however, dispersing the oxygen too actively.

Furthermore, the dissolving of the total quantity of zinc contained in the starting material is not aimed for. This complete dissolving demands excessively high rates of oxidation which give rise to undesirable reactions.

Since the iron is kept in its reduced form, a free acidity of the zinc sulphate solution which is substantially weaker than that obtained by the process of British Pat. No. 3 144 966 can be tolerated, without the residue obtained containing jarosite resulting from the precipitation of iron. The ratio between ferrous iron and the acidity of the solution is such that it is recommended, according to the invention, to maintain the ferric iron content below 1 g/l, when the acidity reaches 20 g/l, and below 5 g/l when the acidity is 50 g/l.

Provided the above contents are respected, the dissolved iron is prevented from precipitating in the form of jarosite and, in particular, the formation of silver- and lead jarosite is prevented.

The oxygen pressure can remain constant during the entire duration of the reaction which dissolves sulphides. It should then be controlled from the start according to the final desired acidity result, without precipitation of iron, taking into account that the proportion of zinc dissolved should be above 85%.

The oxygen pressure can also decrease from the beginning to the end and be thus adapted to the decreasing reactivity of the sulphides during the course of reaction. This variation in pressure can be achieved in a tubular reactor.

The course of reaction during leaching can be followed by taking a series of samples and subjecting them to an automatic analysis, in order to determine the acidity and the concentration of total dissolved iron and to measure the redox potential. A computer calculates the ferric iron content according to time, in such a manner as to allow the course of reaction to be followed and controlled and the oxidation rate to be restricted to the desired level.

The leaching under pressure 4 is conducted in such a manner as to produce, on the one hand, a residue containing residual sulphides including those of zinc, copper and iron, sulphur as well as the total lead and precious metals, principally silver free from jarosite precipitates, and on the other hand, a solution containing, besides residual acid, dissolved iron of the material, principally in the form of ferrous iron, zinc and copper of the said material. The mixture is discharged from the autoclave which has been decreased to atmospheric pressure and cooled to a temperature of from 75° to 95° C. The solution obtained after separation of the residue is conducted to the atmospheric leaching 2 with low acidity, described above, where the residual acidity is exhausted to about 4 to 8 g/l.

The insoluble residue, separated from the solution after thickening at 5, is conducted to the leaching 6 which constitutes the second stage of the double leaching 4 and 6, and is dispersed in a solution of sulphuric acid, generally consisting of the electrolysis recycle solution. This solution normally contains from 160 to 200 g/l of free acid. The temperature is kept below the boiling point of the solutions, preferably between 80° to 95° C.

The dispersion is treated in a receiver, under atmospheric pressure, with intense stirring and the injection of finely-dispersed oxygen into the suspension, the relative quantities of acid and insoluble residue being controlled such that the final acidity is from 60 to 160 g/l, preferably from 100 to 120 g/l.

The quantity of oxygen injected is such that the oxidation-reduction potential of the suspension does not exceed a low value during the entire leaching the content of ferric iron being from 2 to 3 g/l on completion of the operation.

This leaching is also conducted in the presence of residue resulting from the acid leaching 14 described above. By being dissolved in the acid solution, the zinc ferrite contained in this residue brings ferric iron into solution, which oxidizes the sulphides and thus accelerates the reaction kinetics.

During this operation, the zinc is completely dissolved, although it is known that the consumption of zinc by sulphurous material by an atmospheric leaching is extremely difficult.

At the same time, the copper which is principally associated with chalcopyrite almost completely dissolves, the extraction yield being capable of reaching more than 95%. This dissolving is favoured by the simultaneous presence of ferric iron which decomposes the chalcopyrite to chalcocite and the presence of ferric iron oxidizing this chalcocite to dissolve the copper.

The residues obtained after separation by decantation 7 of the solution which is conducted to the leaching under pressure 4, are washed and treated by flotation. The concentrate of sulphur and sulphides obtained contains about 95% of silver which can be recovered, for example according to the method of Belgian Pat. No. 847 991. The sterile flotation product now only containing traces of silver and optionally lead in the form of sulphate, and can be eliminated definitively or, if the economic conditions are favourable, be treated likewise by flotation.

Isolating the silver almost entirely in a single fraction of the residue of the leachings has an important economic repercussion, since it simplifies the problem of recovering this value and dissociates the problem of this recovery from that of lead which is very often uneconomical.

It has also been noted that the sulphation of the sulphides to sulphate during the two stages of leaching is limited to 3 to 6%, which corresponds to the sulphation rate normally obtained by roasting sulphurous materials. This sulphation rate no longer necessitates the purification of the sulphates by the addition of lime.

The complete material balance of all these operations indicates that the proportion of sulphurous materials which can be treated without prior roasting rises to 75 to 80% of the total supply, which allows the rates of use of the roasting furnaces to be very substantially reduced, or their capacity in the production of zinc by hydrometallurgy to be restricted.

In each of the above-mentioned leachings, specific conditions have been adopted to produce the same chemical reactions. These reactions which relate for example, to the dissolving of zinc, are as follows:

$$ZnS + Fe_2(SO_4)_3 \rightarrow ZnSO_4 + 2FeSO_4 + S \qquad (I)$$

and $$2FeSO_4 + \tfrac{1}{2}O_2 + H_2SO_4 \rightarrow Fe_2(SO_4)_3 + H_2O \qquad (II)$$

Taken as a whole, these two reactions can be written as follows:

$$ZnS + \tfrac{1}{2}O_2 + H_2SO_4 \rightarrow ZnSO_4 + S + H_2O \qquad (III)$$

Similar reactions can be written for iron, lead, copper, cadmium and silver.

Although the iron sulphide contained in the material partially dissolves at the same time as the zinc sulphide, it is nevertheless necessary to ensure that the solution contains iron ions at the beginning of the reactions.

These reactions give rise to three phases, a phase containing metal sulphides, a liquid phase containing acid and iron ions acting as intermediary for oxidizing these sulphides by means of oxygen, and finally a gaseous phase containing oxygen.

The metallic sulphides, principally zinc sulphide, are thus oxidized by ferric ions of the solution to form soluble or insoluble metallic sulphates, ferrous ions and sulphur formed in a solid or liquid phase according to whether the temperature is below or above about 120° C. The ferrous ions of the solution are oxidized to ferric ions by the oxygen of the gaseous phase.

The net result is a consumption of acid and oxygen with the formation of sulphate and sulphur. The kinetics of each of the reactions (I) and (II) are not only dependent on the temperature, but also on the different diffusion processes, on the one hand, from the liquid phase towards the solid phase and vice versa and, on the other hand, of the gaseous phase towards the liquid phase.

For the precise conditions of stirring, oxygen pressure, temperature, reactivity of the sulphides, a certain ferric iron-ferrous iron equilibrium is established. Since the reactivity of the sulphides decreases during the process of dissolving, this equilibrium is progressively shifted towards increasingly higher ferric iron-ferrous iron ratios.

If the leaching under pressure is considered at a temperature above the melting point of sulphur, it is noted that the dissolving of the zinc sulphides according to the reactions (I) and (II) is very rapid.

In order to maintain the oxidizing conditions within the desired limits, the stirring of the 3-phase system is adjusted, according to the invention, to render the transfers between liquid and solid more favourable than the transfers between gas and liquid, and the partial pressure of oxygen is adjusted, being either maintained at a constant value such that the concentration of ferric iron corresponding to a certain rate of dissolution of zinc, does not exceed the desired concentration, or regulated in a decreasing manner.

Since the iron is maintained in its reduced form, it is to be noted that the free acidity of the zinc sulphate solution can be substantially low, without the obtained residue containing jarosite resulting from the precipitation of iron. This precipitation takes place according to the following reaction, for example:

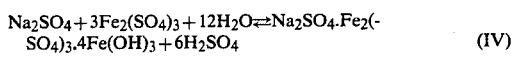

At the same time, the Pb and Ag ions also react with the ferric iron to form lead and silver jarosites according to a similar reaction.

The content of ferric iron in solution is all the lower since the free acidity is lower. An increase in temperature reduces the concentration of ferric acid with a constant acidity of the solutions.

It is recommended according to the invention, so as not to precipitate jarosite, to maintain the content of ferric iron below about 1 g/l when the acidity reaches 20 g/l and below about 5 g/l when the acidity is 50 g/l.

The reactions 1 and 2 take their course according to overall slower kinetics at a temperature below the boiling point of the solutions and under atmospheric pressure.

The residue of the leaching under pressure is leached in the presence of an acid solution at the same time as the zinc ferrite residue at 6. The ferric ions supplied by this material and the maintenance of a high proportion of acid favour the dissolving of the residual sulphides. The ferric iron proportion is kept at relatively low values, so that the oxygen yield is kept at a high value. Jarosites accidentally precipitated in the leaching under pressure are totally redissolved, the operating conditions being such that the reaction (IV) is shifted towards the left.

Finally, the neutralization of the free acid contained in the solution resulting from the leaching under pressure 4 is carried out at 2 according to the same reactions (I) and (II) by means of sulphides and oxygen.

It is to be noted, however, that the kinetics of dissolution of sulphides become extremely slow when the free acidity of the solution is below about 35 to 40 g/l. Moreover, since the content of ferric iron of the solution must be maintained at values which are sufficiently low so as not to precipitate iron in the form of jarosite, it is necessary to introduce an excess of sulphide to increase the number of active centres of reaction. At the same time, the oxygen yield can be kept at a high value.

These three successive operations conducted in counter current result, on the one hand, in the substantial consumption of the free acid of the return solution resulting from the electrolysis 32, the content of which is increased to from about 160 to 200 g/l, while producing a metallic sulphate solution principally consisting of zinc, iron and copper containing only a small amount of free acid and, on the other hand, in the complete consumption of the sulphurous material of the zinc and the copper which it contains while producing an insoluble residue containing lead and precious metals.

Figure 2:
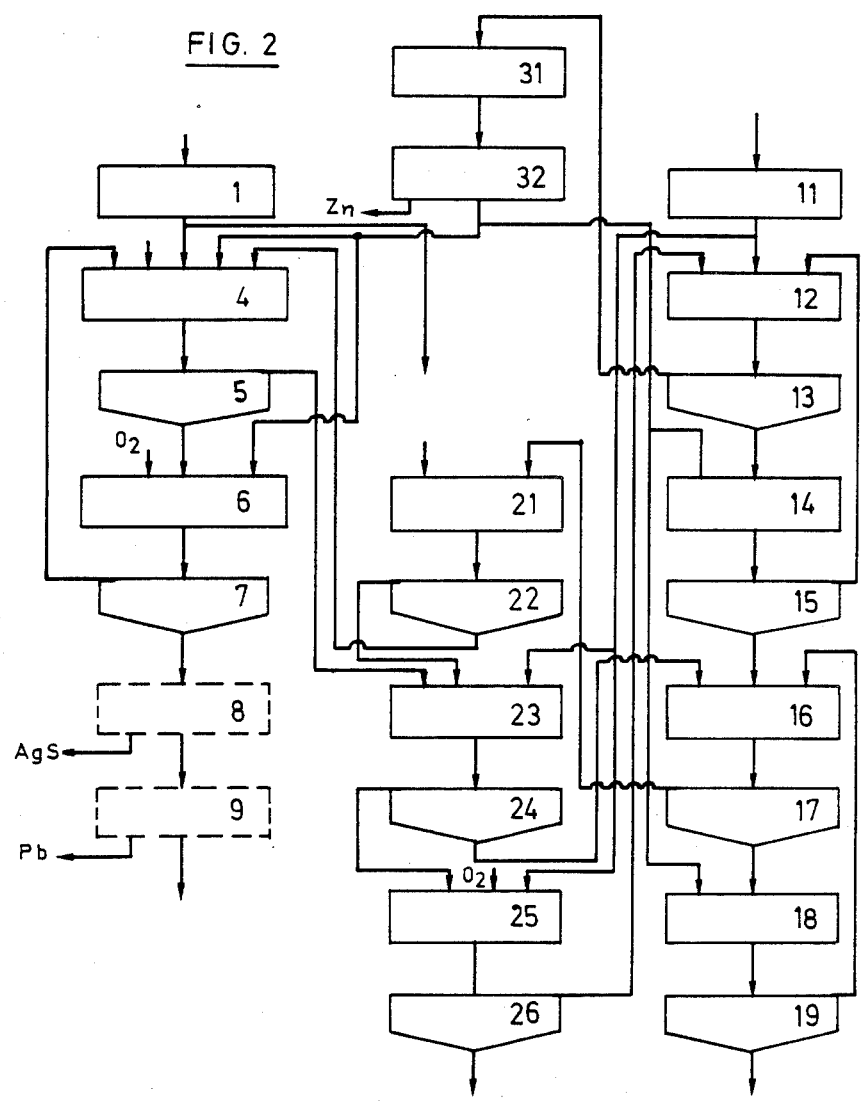
FIG. 2 is a similar view of a process designed to modify an existing installation for treating sulphides after roasting.

According to the process in FIG. 2, the solution produced in the double leaching 4 and 6, weak in ferric iron, is supplied to the neutralization 23 of a leaching circuit of calcine obtained by roasting 11. The residue of this operation contains insoluble zinc ferrite which is treated in two stages in counter current, that is the hot acidic leaching 16 and the hot, very acidic leaching 18, which is supplied by the acid electrolysis return solution 32. The final solution of these two stages in counter current contains zinc and iron resulting from zinc ferrite. The iron is reduced in the presence of sulphurous reducing material 21. The residue of sulphur and residual sulphides is treated in the leaching under pressure 4.

The ferrous acidic solution is neutralized at the same time as the solution resulting from the leaching under pressure 4, at the neutralization 23, as explained above. The iron of the solution resulting from the neutralization 23 is hydrolysed 25 by the injection of oxygen and the addition of calcine as neutralizer. The iron residue is discarded. The slightly acid solution containing small quantities of ferrous iron is treated at the neutral leaching 12 by means of calcine 11, and is then purified 31 and electrolysed 32. The residue 12 is consumed in the acidic leaching 14, of which the ferrite residue is treated in the hot leachings 16 and 18. A part of this ferrite residue is treated in the atmospheric leaching with high acidity 6. The proportion of sulphurous materials which can be treated without prior roasting can be from 30 to 40% according to the operating conditions of the leaching under pressure 4.

Figure 3:
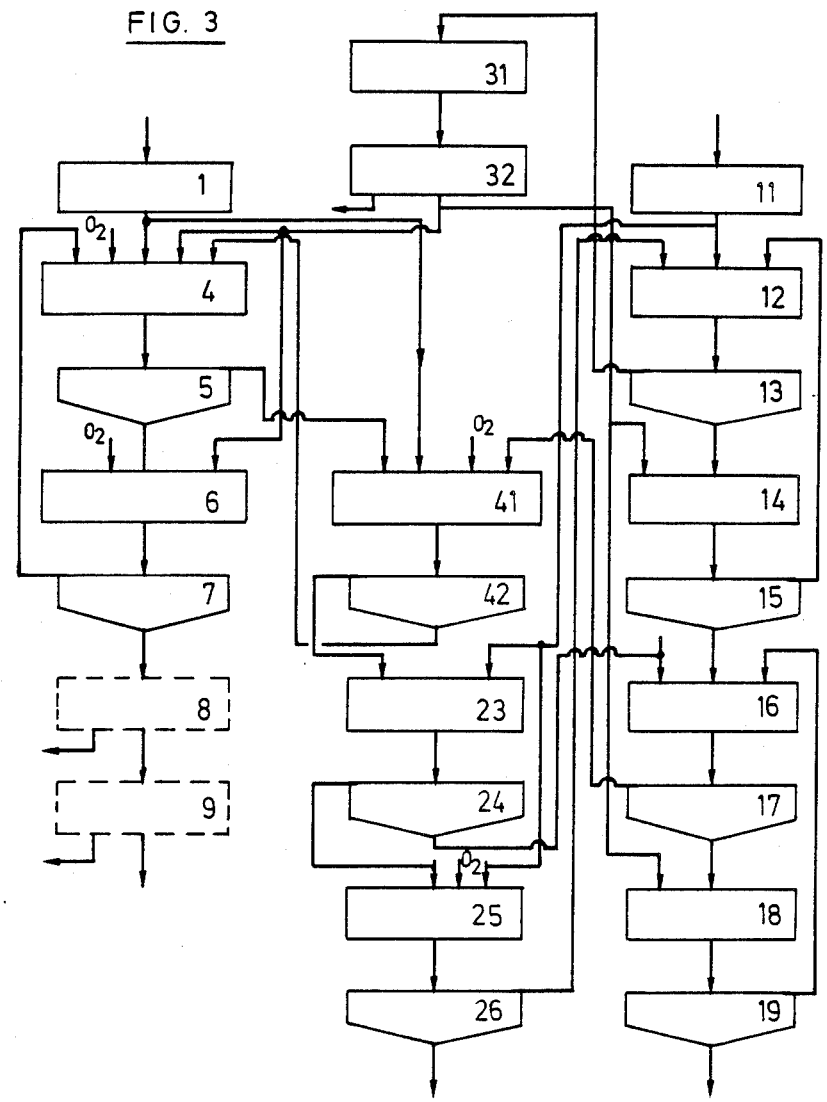
FIG. 3 is a similar view of a process linking the process in FIG. 2 to the process in FIG. 1.

According to the process in FIG. 3, the ferrous solution produced in the double leaching 4 and 6 is treated in the atmospheric leaching 41 at the same time as the solution produced by the two stages in counter current of the hot leaching 16 and 18 of calcine described above, in the presence of sulphurous zinciferous material, suspended with intense stirring and in the presence of oxygen injected into the pulp in a finely-dispersed form, the quantity of material and of oxygen being controlled in such a manner as to obtain a final acidity of from 6 to 35 g/l and a content of ferric iron of from 1 to 2.5 g/l.

The temperature of the suspension is maintained below the boiling point of the solution and preferably between 75° and 95° C.

The residue obtained after separating the solution by thickening is supplied to the leaching under pressure. The iron of this solution resulting from the said leaching 4 is neutralized and precipitated, and the solution is then treated in the same manner as that described above.

The advantage of the process is that it allows a very great flexibility.

Indeed, the last process allows the two extreme processes represented in FIGS. 1 and 2 to be combined. It is possible to progressively pass from the scheme of FIG. 2 to that in FIG. 1 without fundamental modifications.

Thus, a zinc plant having apparatus for treating calcine obtained by roasting 11 can combine the operations 1, 4 and 7, the solutions of which can be easily treated according to the scheme in FIG. 2 in the existing apparatus; a fraction of about 30% of the sulphurous material can thereby be leached without roasting being necessary.

By putting into operation the process illustrated in FIG. 3, sulphurous material can increasingly be treated without prior roasting, until an extreme quantity of about 80% is achieved when the process illustrated in FIG. 1 is put into operation, in which process the operations for reprocessing the zinc ferrite residues 16 to 19, 41, 42, 23, 24 of the calcine 11 are eliminated, the troughs thus freed being progressively used for the atmospheric leachings of the sulphides. An existing apparatus can, therefore, without great modification, increase its zinc production capacity, or safeguard its production capacity even if the number of roasting units is reduced.

In order to avoid inhibition of the reactions dissolving the sulphides, an effective quantity of organic compounds having ionic properties is advantageously added to the suspension constituting the reaction mixture. These compounds are preferably polyelectrolytes or oxidation-reduction indicators. Excellent results are obtained with the following polyelectrolytes:

the anionic polymers and copolymers of acrylic acid with polyethylene oxide or of formaldehyde and melamine with a molecular weight of from $10^5$ to $10^7$ and the anionic polymers of methacrylic acid and the corresponding copolymers.

Among the oxidation-reduction indicators, two compounds have been retained. These are ortho-phenylene diamine and the mixtures of ortho-, meta- and para-phenylene diamine. However, other usual oxidation-reduction indicators, such as methylene blue and diphenylamine-para-sulphonic acid can be used.

The quantity of organic compounds to be added is generally between 0.1 and 1.0 g/l of the solution to be leached under pressure.

The starting ores or concentrates can be made up of blendes of diverse origins containing variable quantities of iron consisting either of marmatite or of pyrite and containing variable values of copper, precious metals and/or lead.

The following examples illustrate different embodiments of the process:

In each of these examples, the sulphurous starting material has the same composition according to the following analysis:

Zn: 49.6%; Cu: 0.94%; Fe: 9.6%; Pb: 1.35%; S tot.: 30.8% and Ag: 120 g/t.

The electrolysis return solution contains 195 g/l of free sulphuric acid and 55 g/l of zinc.

The sulphurous material is previously ground until a fraction of about 92% of the material passes through a 325 mesh sieve. The pulp resulting from grinding is filtered. The filtration cake contains 20% of moisture and is supplied in this form to the different experiments in the following examples.

EXAMPLE 1

This example comprises three experiments.

The first two experiments relate to a leaching under pressure. It is ensured that the proportions of sulphurous starting material and acid solution produce, after reaction, a solution with a strong residual acidity and substantially oxidized. The third experiment relates to a double leaching, that is a leaching under pressure followed by an atmospheric leaching of the sulphurous starting material. The proportions of material and acid solution are such that the solution obtained after leaching under pressure is hardly acidic and hardly oxidized.

The leaching under pressure is carried out in a 16 l autoclave provided with a stirrer and counter stirrers. The temperature is maintained at from 135° to 140° C. after a rapid increase in temperature. The oxygen pressure is maintained at a partial pressure of 1300 Kpa. The oxygen is injected above the pulp. The acid solution is made up of electrolysis return acid to which is added a solution, the composition of which corresponds to that which is produced in the atmospheric leaching. The mixture has the following composition:

$H_2SO_4$ = 185 g/l;
Zn = 60 g/l;
Fe: 2 g/l;
$Fe^{3+}$: 0.2 g/l;
$Fe^{2+}$: 1.8 g/l and
Cu: 0.5 g/l.

12 liters of this solution are introduced into the autoclave. The quantity of sulphurous material is respectively:

| experiment 1 | experiment 2 | experiment 3 |
|---|---|---|
| 127.5 g/l | 150 g/l | 200 g/l | expressed in grams of material (dry) per liter of leaching solution.

The insoluble residue obtained in the first two experiments is filtered, washed, repulped in water and subjected to a flotation to separate the sulphur, the residual sulphides and the silver.

The residue from the experiment is separated by decantation and the thickened pulp, the volume of which is 2 liters, is pulped with 6 liters of electrolysis return solution.

The pulp is stirred at 90° C. while dispersing oxygen therein. The insoluble residue obtained is filtered, washed repulped in water and subjected to a flotation under the same conditions as above.

The results are given in the following tables.

TABLE 1

Composition of the solution during leaching.

| Experiment No. | Conditions | $H_2SO_4$ g/l | $Fe_{tot}$ g/l | $Fe^{3+}$ g/l | Cu g/l |
|---|---|---|---|---|---|
| 1 | | <u>74</u> | 12.2 | <u>10.1</u> | 1.080 |
| 2 | | <u>58</u> | 12.7 | <u>10.6</u> | 1.190 |
| 3 | 1st stage under pressure | <u>32</u> | 14.5 | 1.5 | 1.050 |
|   | 2nd stage under atmospheric pressure | 113 | 6.6 | 2.5 | 1.900 |

TABLE 2

Composition of the insoluble residue and quantity dissolved.

| Experiment No. | | Zn % | Fe % | Cu % | S % | $S_{SO_4}$ % |
|---|---|---|---|---|---|---|
| | | 1.70 | 4.60 | 1.32 | 76.2 | 0.54 |
| | | 1.55 | 6.40 | 1.24 | 72.1 | 0.94 |
| | 1st stage | 10.40 | 7.50 | 1.44 | 66.1 | 0.38 |
| | 1st and 2nd stage | 2.20 | 5.65 | 0.063 | 75.55 | — |

TABLE 3

Weight of zinciferous material dissolved (%) and quantity dissolved (%) of various metals

| Experiment No. | | Fraction of weight | Quantity dissolved expressed in % | | | |
|---|---|---|---|---|---|---|
| | | | Zn | Fe | Cu | Stot. |
| 1 | | 62.8 | <u>98.7</u> | 82.2 | 47.8 | <u>8.0</u> |
| 2 | | 61.4 | <u>98.8</u> | 74.3 | 49.1 | <u>9.4</u> |
| 3 | 1st stage | 55.1 | <u>90.6</u> | 65.9 | 31.2 | <u>3.3</u> |
| | 1st and 2nd stage | 60.4 | 98.2 | 76.8 | 97.3 | 3.1 |

TABLE 4

Development of the composition of the leaching solution of experiment no. 3 when the latter is carried out under atmospheric pressure.

| Time H | Content in the solution of | | | |
|---|---|---|---|---|
| | $H_2SO_4$ | $Fe_{tot}$ | $Fe^{3+}$ | Cu |
| 0 | 147 | 3.6 | 0.1 | |
| 1 | 137 | 4.6 | 0.2 | |
| 2 | 127 | 5.6 | 0.7 | |
| 4 | 115 | 6.5 | 1.9 | |
| 5 | 113 | 6.6 | 2.5 | 1.90 |

The flotation of the residues obtained give a rough concentrate of sulphur and a sterile flotation product. The rough concentrate is diluted with water and itself subjected to a flotation producing a finished sulphur concentrate and a finishing sterile product. The results of the operations are drawn up from the analysis of the different fractions.

TABLE 5

Composition of the fractions obtained by flotation

| | Ag g/l | Pb % | Zn % | Fe % | Cu % | $S_{tot}$ % |
|---|---|---|---|---|---|---|
| Experiment 1 | | | | | | |
| finished concentrate | 285 | 0.35 | 1.95 | 5.1 | 1.52 | 88.2 |
| sterile finishing product | 440 | 15.9 | 0.15 | 1.8 | 0.16 | 35.9 |
| sterile flotation product | 430 | 21.8 | 0.07 | 1.65 | 0.06 | 3.9 |
| Experiment 2 | | | | | | |
| finished concentrate | 260 | 0.40 | 1.65 | 6.3 | 1.45 | 83.1 |
| sterile finishing product | 500 | 19.9 | 0.30 | 6.4 | 0.06 | 38.3 |
| sterile flotation product | 555 | 20.1 | 0.25 | 5.8 | 0.03 | 4.7 |
| Experiment 3 | | | | | | |
| finished concentrate | 310 | 0.56 | 2.35 | 6.1 | 0.072 | 84.7 |
| sterile finishing product | 305 | 19.1 | 0.09 | 1.35 | 0.012 | 30.1 |
| sterile flotation product | 170 | 22.7 | 0.14 | 0.63 | 0.007 | 4.35 |

TABLE 6

Weight of the fractions recovered in relation to the weight of the residue subjected to flotation (expressed in (%) and yield of metals recovered (%).

| | weight | Ag | Pb | Zn | Fe | Cu | $S_{tot}$ |
|---|---|---|---|---|---|---|---|
| Experiment 1 | | | | | | | |
| finished concentrate | 84.6 | 78.4 | 8.6 | 99.2 | 94.3 | 99.0 | 97.7 |
| rough concentrate | 88.2 | 83.5 | 25.2 | 99.5 | 95.7 | 99.5 | 99.4 |
| Experiment 2 | | | | | | | |
| finished concentrate | 85.4 | 73.5 | 10.4 | 97.4 | 86.2 | 99.6 | 88.1 |
| rough concentrate | 87.5 | 77.0 | 23.2 | 97.8 | 88.4 | 99.7 | 99.2 |
| Experiment 3 | | | | | | | |
| finished concentrate | 87.4 | 91.0 | 15.3 | 99.2 | 98.0 | 98.3 | 98.0 |
| rough concentrate | 91.3 | 95.0 | 38.5 | 99.4 | 99.0 | 99.0 | 99.5 |

The results of experiment 3 carried out according to the double leaching compared with those of experiment 1 and 2 carried out in a single leaching under pressure, show the following advantages for an equivalent zinc solution yield:

an overall dissolving of copper rising to greater than 97%, whereas it is limited to less than 50% by leaching under pressure alone;

a very low direct sulphation of about 3% of the sulphides whereas it is at least 8% in experiments 1 and 2;

a recovery of silver in the silver concentrate obtained by flotation of the residues, which rises to about 95% in spite of the low final acidity of 32 g/l of the solution of leaching under pressure, whereas this recovery according to the process of leaching under pressure alone is limited to 85%, even if the acidity is above 70 g/l and decreases further if this acidity decreases.

EXAMPLE 2

1700 g (calculated dry) of sulphurous zinciferous starting material are added to 12 liters of solution as described above.

After the leaching under pressure carried out under the operating conditions of experiment 2 in Example 1, the same results are obtained as those described therein. Among others, the dissolved quantity of copper increases to about 48%.

The pulp discharged from the autoclave is treated according to the following methods.

Experiment 1

The pulp is stirred during 4 hours at 90° C. in the absence of oxygen.

Average solution titre:

$H_2SO_4$: 57 g/l
$Fe_{tot}$: 12.5 g/l
$Fe^{3+}$: 10.5 g/l

The residue obtained contains 38.2% by weight of the starting material. The copper content is 1.14%, which corresponds to a total dissolution of copper increasing to 53.7%.

Experiment 2

The residue is separated from the solution by thickening. The decanted pulp is pulped in a solution titrating on average during the experiment:

$H_2SO_4$: 60 g/l
$Fe_{tot}$: 10 g/l
$Fe^{3+}$: 2.8 g/l

This pulp is stirred for 4 hours at 90° C. in the presence of a small quantity of oxygen designed to maintain the ferric iron content.

The residue obtained has a weight equal to 37.6% of the initial weight. The copper content is 0.120%, which corresponds to a total dissolved quantity of copper rising to 95.20%.

EXAMPLE 3

12 l of solution from the autoclave of the leaching under pressure are stirred in the presence of 900 g (calculated dry) of sulphurous starting material added progressively and in equal proportion to time 0, after ½ l and after 1 hour. The finely-dispersed oxygen is injected during the entire duration of the experiment. The temperature is maintained at 90° C.

The results of this leaching are given in the following table.

| Time H | $H_2SO_4$ g/l | $Fe^{3+}$ g/l | $Fe_{tot}$ g/l | Cu g/l |
|---|---|---|---|---|
| 0 | 40 | 1.8 | 14.0 | 1.375 |
| ½ | 35 | 0.5 | 14.3 | 1.375 |
| 1 | 28 | 0.6 | 15.0 | 1.375 |
| 2 | 18 | 0.8 | 15.7 | 1.375 |
| 3 | 12 | 1.2 | 16.2 | 1.310 |
| 4 | 6 | 1.6 | 16.5 | 1.300 |

The weight of the residue is 626.4 g or 69.6% of the material supplied.

It is to be noted that the iron does not undergo precipitation and that the copper only precipitates in very low proportions.

The final acidity of the solution reaches 6 g/l. It has a sufficiently low value to allow the solution to be used in the hydrolysis of iron 25.

It is evident that the invention is not limited to the methods of operation of the process described above and that numerous modifications can be made to these methods without detracting from the scope of the following claims.

I claim:

1. A hydrometallurgical process for extracting zinc and copper and recovering lead and silver from zinc and copper containing sulphidic materials also containing iron, and at least one metal selected from the group consisting of copper, lead and silver comprising:
   (1) finely grinding said zinc containing sulphidic materials; and
   (2) leaching said materials in at least two steps comprising:
      (A) leaching said materials at a temperature of from 120° to 160° C. above the melting point of sulphur under oxidizing conditions and in the presence of an aqueous solution of sulphuric acid, the zinc being incompletely dissolved, and
      (B) leaching a residue of the first leaching step (A) at atmospheric pressure in the presence of an aqueous solution of sulphuric acid and under oxidizing conditions provided by finely dispersed oxygen so as to produce a zinc sulphate solution and a residue containing sulphur, residual zinc, residual copper, iron and most of the lead and silver;
said process further comprising:
   (I) during the first leaching step (A),
      (i) adding said starting materials in an aqueous solution comprising sulphuric acid and a solution produced after the second leaching step (B) in such a manner that the zinc contained in said materials is in stoichiometric excess related to the free acid actually consumed and allowing the reaction to take place until a zinc sulphate solution containing from 20 to 60 g/l of free sulphuric acid is obtained;
      (ii) controlling the excess of said materials not only in order to facilitate the free sulphuric acid consumption, but also in order to prevent the precipitation of iron solubilized with zinc by limiting the ferric iron formation making use of the reducing properties of said materials, in such a manner that said zinc sulphate solution contains a ferric iron concentration which does not exceed from 1 to 5 g/l;
      (iii) producing, by these controls, after liquid-solid separation, an undissolved residue containing the reacted sulphur substantially in an elemental form, residual zinc, residual copper and iron, in the form of sulphides substantially free from jarosite and substantially all of the lead and silver free from jarosite;
   II. during the second leaching step (B):
      (i) completing the extraction of the residual zinc of said first leaching step (A) by contacting the residual zinc with an aqueous solution of sulphuric acid at atmospheric pressure, and a temperature below the boiling point of the mixture;
      (ii) controlling the amount of this solution in such a manner that, after consumption of the free acid by all of the residual zinc, the solution produced contains an excess of free acid, the excess being comprised of between 35 and 160 g/l;
      (iii) controlling the electrochemical potential of the solution by adjusting the quantity of oxygen in such a manner as to produce a solution which contains from 2 to 3 g/l ferric iron and in which a main part of the residual copper of said first leaching step is dissolved;
      (iv) returning, after liquid-solid separation, the solution to said first leaching step (A); and
      (v) producing, by these controls, an undissolved final residue containing the reacted sulphur substantially in an elemental form, iron in the form of sulphide free from jarosite and most of the lead and silver contained in the starting materials in a mineralogical form such that the lead and silver materials can be recovered by a flotation process.

2. A process according to claim 1 further comprising conducting the solution produced in the first leaching step (A) and containing from 20 to 60 g/l free sulphuric acid to a third leaching step (C) comprising:
   (i) adding an amount of said starting sulphidic materials in such a manner that the Zn contained in it is in stoichiometric excess related to the free sulphuric acid of the said solution; and
   (ii) controlling the electrochemical potential of the solution by adjusting the quantity of oxygen, the excess of said starting sulphidic materials and the oxygen amount being selected so as to produce a zinc sulfate solution with a concentration of free sulphuric acid comprised of between 4 and 8 g/l and the concentration of ferric iron comprised of between 1 and 2 g/l
   (iii) conducting, after liquid-solid separation, this solution in a known manner to further purification treatments and finally to electrolysis wherein Zn is produced and an aqueous solution of sulphuric acid is regenerated which is used in the leaching steps A and B;
   (iv) conducting the undissolved residue containing sulphur, zinc sulphide, copper sulphide and iron substantially free from jarosite, all of the lead and silver to the first leaching step (A)
said steps (i) and (ii) being conducted at atmospheric pressure, a temperature below the boiling point of the mixture and in the presence of finely dispersed oxygen.

3. A process according to claim 1, further comprising conducting the solution produced in the first leaching step (A) to a neutralization of free sulfuric acid at the same time as a solution resulting from a second process, by means of calcine obtained by roasting zinc-containing sulphidic materials.

4. A process according to claim 3, further comprising subjecting the solution resulting from the neutralization to hydrolysis by adding calcine in the presence of oxygen in order to precipitate the iron as a geothite which is separated from the solution and discarded.

5. A process according to claim 4 further comprising subjecting the solution resulting from the hydrolysis to a neutral leach by adding calcine followed by a purification with zinc powder, and subjecting the purified solution to electrolysis wherein zinc is produced and an aqueous solution of sulphuric acid is regenerated which is used in the first and second leaching steps (A) and (B), and contacting the residue of the neutral leach in a weak acid leach using an aqueous solution of sulphuric acid and treating a residue obtained in a residue treatment comprising a hot and superhot leach and a reduction step by which a solution of a second process is produced.

* * * * *